Oct. 20, 1964  W. SCHAFFER  3,153,559
ANTI-SKID BRAKE MECHANISM
Filed March 29, 1961
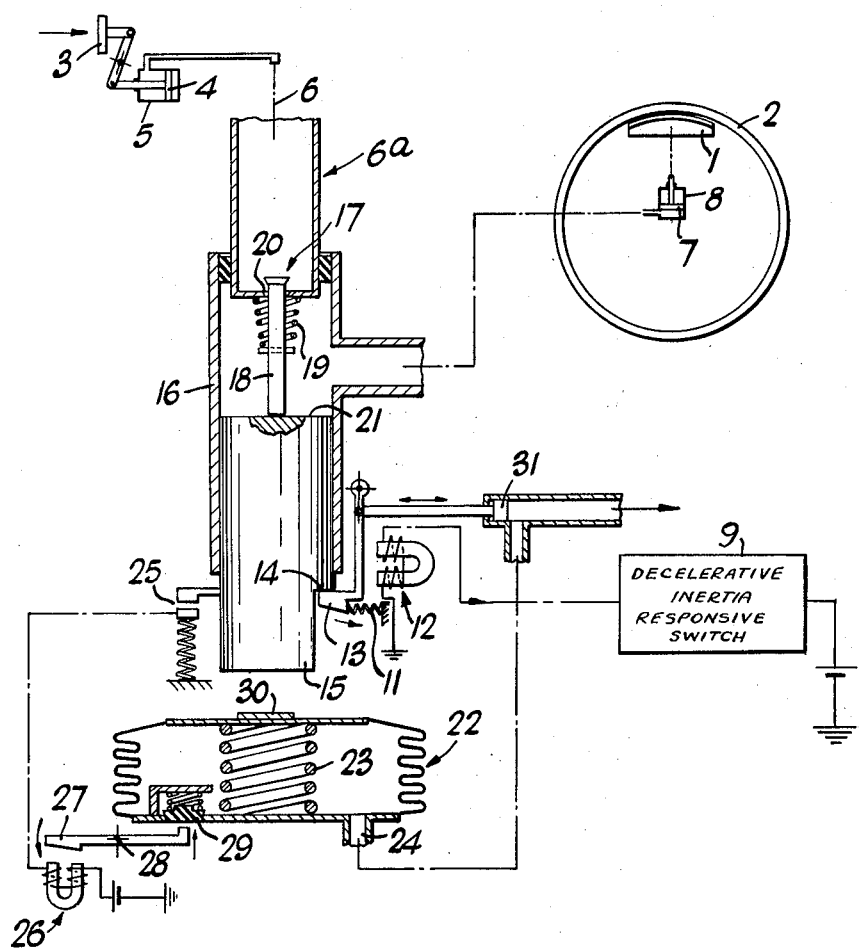
INVENTOR
WALTER SCHAFFER
BY
Lawson and Taylor 3,153,559
ANTI-SKID BRAKE MECHANISM
Walter Schaffer, London, England, assignor to National Research Development Corporation, London, England, a British corporation
Filed Mar. 29, 1961, Ser. No. 99,230
Claims priority, application Great Britain Apr. 7, 1960
10 Claims. (Cl. 303—21)

This invention relates to braking mechanisms, these being so constructed as to tend to release the brake should the movement of the braked parts decelerate violently. The invention is particularly relevant to braking mechanisms for the wheels of motor cars; if the angular velocity of these wheels drops violently the car usually skids.

The scope of the invention is defined by the appended claims, and the preferred construction according to the invention will now be described by way of example with reference to the accompanying drawing, in which there is shown a diagrammatic representation of a preferred embodiment of the invention.

The embodiment shown represents the applicable portions of a braking mechanism in a car having hydraulically operated drum brakes. Each of the brakes has as a braking element a set of shoes being caused to engage the drum 2 by an operator pressing a brake demand member on a foot-pedal 3. The pedal 3 is linked to a piston 4 working in a hydraulic cylinder 5, and the force exerted on the piston 4 is transmitted through a fluid linkage constituted by a mass of fluid 6 contained in a conduit 6a to a piston 7 working in a cylinder 8, there being one such cylinder associated with each of the shoes 1 or with each set of shoes.

Each drum 2 has associated with it an operating device comprising an inertia operating switch 9. The inertia operating switch 9 may be a known type of switch actuable by a predetermining inertia force upon deceleration of each rotating drum in excess of a selected rate. Such switches are well known and normally include a mass moving with each drum, the mass tending to maintain its motion when the drum is violently decelerated. A relative displacement between the mass and drum results, thereby effecting the closing of a pair of electrical contacts by the displacement. The closing of the inertia switch 9 whenever the deceleration rate exceeds the preselected value causes the solenoid 12 to become energised. A pivotably mounted pawl 13, normally held in engagement with a notch 14 of the slideable piston 15 by a compression spring 11, is then disengaged by the attraction of the pawl 13 to the solenoid 12 overcoming the force of the spring 11. The piston works in a cylinder 16 which forms part of the conduit 6a and which is situated between the cylinder 8 and a locking device constituted by a poppet-type valve 17. Valve 17 includes a valve stem 18 engageable with the piston 15 and operating to hold the valve 17 open when the piston is in the position shown in the drawing. When closed, valve 17 blocks the conduit 6a, so holding the foot-pedal 3 against harder application and breaking operative connection between the pedal 3 and shoes 1. The valve 17 is loaded by a spring 19 to close onto a valve seat 20 when permitted. When the pawl 13 engages the notch 14 the piston 15 holds the valve spindle 18 off the seat 20, and therefore isolates the pedal 3 and the brake shoes 1. When the pawl 13 disengages, the piston 15 drops by reason of the pressure of the brake fluid on its upper face 21. As it does so, the valve 17 quickly closes onto the seat 20 and thereafter the valve spindle 18 separates from the piston 15 as the latter continues to drop. The brake shoes 1 are now shut off from the pedal 3 by the closed valve 17. Since the space available for fluid in the part of the conduit 6a "downstream" of the valve has been increased from a normal minimum volume by the space vacated by the piston 15, the fluid linkage is relaxed, the pressure of the fluid against the piston 7 is reduced, and the brake shoes are released.

Beneath the piston 15 is situated the restoring device, a collapsible capsule 22. A strong spring 23 urges the capsule into its expanded condition, but the interior of the capsule is normally connected by way of a pipe 24 to the intake manifold of the motor car engine. A vacuum is thus created inside the capsule which causes it to collapse against the force of the spring. As the piston 15 drops, it closes a microswitch 25 and so energises a relay 26. This attracts one end of a lever 27, causing the lever to pivot about a fulcrum 28 and open a spring-loaded plug valve 29 in the bottom of the capsule 22. The interior of the capsule is thus opened to atmosphere and with the release of the vacuum the spring 23 causes the capsule to expand. The bearing plate 30 on top of the capsule therefore meets the end of the descending piston 15 and forces the piston upwards again towards its original position. As the piston reapproaches this position, the spring-loaded pawl 13 should already have been released by the relay 12, since by this time the release of the brakes should have lessened the deceleration of the wheels. Therefore at substantially the same time as the expanding capsule returns the piston to its normal position and the fluid linkage re-assumes its unrelaxed state, the valve 17 should re-open, thereby re-establishing operative connection between the shoes 1 and the pedal 3. At the same time the pawl 13 should re-engage with the notch 14 to hold the piston in its normal position, and the microswitch 25 should open so as to allow the plug-valve 29 to close. Closure of the valve 29 enables a vacuum to build up again within the capsule 22, thereby collapsing the capsule so that it will separate from the piston 15 and rest beneath it in the position shown.

When the plug-valve 29 is open it is of course undesirable that the vacuum source should run to waste sucking air from the vented interior of the capsule. Accordingly, a slide valve 31, sliding in the pipe 24, is controlled by the pawl 13. Only when the latter is released by the relay 12 are the vacuum source and the interior of the capsule in communication. The force exerted by the vacuum source upon the slide valve 31 is not of itself sufficient to overcome the spring-loading of the pawl 13. The piston 15, when released by the pawl 13, moves quickly under the force of the fluid, and the extra volume above normal that it so gives to the space available for fluid in the part of the conduit 6a downstream of the valve 17 may be so chosen that the brake is just released without separating shoe 1 and drum 2 as completely as if the brake were not applied at all. This will allow the mechanism to operate repeatedly and rapidly without the shuddering that would occur if shoe and drum had to move through a considerable distance each time they engaged and disengaged.

Various alternative constructions are of course possible, and the following are given by way of illustration.

The electrical/hydraulic system described can be replaced by, for instance, a wholly hydraulic system in which the place of the microswitches is taken by quick-acting hydraulic valves, or by an electro/mechanical system.

In the preferred construction already described the restoring device is a collapsible capsule biased into the expanded state by a spring but normally held in the collapsed state by a source of power, this source being a vacuum source. Alternatively the source of power may be a source of pressure. This may hold the capsule against a bias in the expanded instead of the collapsed state. For instance, the capsule may be biased into the collapsed state by an external spring and violent angular deceleration of the body may cause the interior of the capsule to communicate with the discharge of an oil pump that works while the car is moving. Oil under pressure will therefore enter the capsule and expand it against the force of the spring. Restoration of the normal force on the braking element may cause the interior of the capsule to open to the car's oil sump, and may simultaneously shut off the interior of the capsule from oil under pressure. The spring will therefore cause the capsule to collapse again. Alternatively a source of pressure might be applied continuously to the exterior of the capsule during normal running of the body to collapse the capsule, and severe rotary deceleration of the body may be used to release the pressure and allow a spring to expand the capsule.

Other variations and modifications can be resorted to without departing from the spirit of the invention or the scope of the claims.

I claim:

1. In a fluid-operating brake system having a fluid linkage operatively connecting a brake operator and a brake mechanism responsive to the operator to engage a moving surface and brake said surface, the improvement of means to reduce the effect of a violent deceleration of the moving surface comprising:

valve means in the fluid linkage movable between an open position and a closed position and biased to the closed position to cut off the fluid linkage and isolate the brake mechanism to prevent response thereof, means defining a fluid chamber in the fluid linkage between the valve means and the brake mechanism and including a piston movable in the chamber between first and second positions to vary the volume of the chamber between a minimum and a maximum, respectively, the valve means including means mechanically engaging the piston to retain the valve means in the open position when the piston is at its first position and to enable the valve means to move to its closed position when the piston moves to its second position, holding means engaging the piston to hold the piston in its first position, release means responsive only to a deceleration of the moving surface in excess of a preselected deceleration rate to release the holding means from engagement and permit movement of the piston to its second position, thereby enabling movement of the valve means to its closed position, and restoring means triggered by the movement of the piston to its second position to return the piston back to its first position and effect a movement of the valve means to the open position to enable response of the brake mechanism.

2. The improvement according to claim 1 wherein the piston has a face in part defining the fluid chamber and the piston is moved to its second position by the pressure of fluid within the fluid chamber, and the means to retain the valve means in its open position comprises a valve stem attached to the valve means and engaging the piston face when the piston is in its first position.

3. The improvement according to claim 2 and comprising a compression spring within the chamber and engaging the stem to urge the valve toward its closed position.

4. The improvement according to claim 1 wherein the piston defines a notch and the holding means comprises a movable pawl, the pawl engaging the notch to retain the piston in its first position.

5. The improvement according to claim 4 wherein the release means comprises an electric circuit including a solenoid, the solenoid operable on energisation to attract the pawl to release the piston notch from engagement with the pawl and enable movement of the piston to its second position, and further comprising spring means urging the pawl back to engagement with the piston notch upon de-energisation of the solenoid.

6. The improvement according to claim 1 wherein the restoring means comprises an expandable capsule, means to expand the capsule to engage the piston and move the piston back to its first position, and means to retain the capsule in a non-expanded state until the piston moves toward its second position.

7. The improvement according to claim 6 wherein the capsule is hollow and includes a bearing plate at one surface to engage the piston, and the expanding means includes a spring mounted within the capsule and urging the bearing plate toward engagement with the piston.

8. The improvement according to claim 7 wherein the means to retain the capsule in its non-expanded state includes a pipe connecting with the interior of the capsule and means to expel air through the pipe to create a vacuum within the capsule.

9. The improvement according to claim 8 and further comprising a plug valve in the wall of the capsule normally closing the interior of the capsule, and comprising electric switch means operable to open the valve when the piston moves toward its second position to release the vacuum and enable expansion of the capsule.

10. The improvement according to claim 8 and further comprising a slide valve in the pipe, the slide valve being operable to close the pipe when the release means operates to release the holding means.

References Cited in the file of this patent

FOREIGN PATENTS 46,753 France _____ June 6, 1936
(Addition to 783,477)